(12) United States Patent
Horn et al.

(10) Patent No.: US 9,158,606 B2
(45) Date of Patent: Oct. 13, 2015

(54) FAILURE REPETITION AVOIDANCE IN DATA PROCESSING

(75) Inventors: Julien Charles Horn, Winchester (GB);
Roger Gordon Lewis, Winchester (GB);
Alan Clive Robinson, Winchester (GB);
Andrew Wright, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1004 days.

(21) Appl. No.: 12/692,332

(22) Filed: Jan. 22, 2010

(65) Prior Publication Data

US 2010/0185903 A1 Jul. 22, 2010

(30) Foreign Application Priority Data

Jan. 22, 2009 (EP) .................................. 09151137

(51) Int. Cl.
*G06F 11/30* (2006.01)
*G06F 11/00* (2006.01)
*G06F 11/22* (2006.01)

(52) U.S. Cl.
CPC .......... *G06F 11/004* (2013.01); *G06F 11/2257* (2013.01); *G06F 11/3051* (2013.01)

(58) Field of Classification Search
CPC ..... G06F 11/04; G06F 11/30; G06F 11/3051; G06F 11/3055; G06F 11/3058
USPC ................................ 714/39, 47.1, 47.2, 47.3
See application file for complete search history.

(56) References Cited

U.S. PATENT DOCUMENTS

| | | | | |
|---|---|---|---|---|
| 5,572,671 | A  * | 11/1996 | Eisenberg et al. | 714/47.1 |
| 6,941,367 | B2 * | 9/2005  | Vosseler et al.  | 709/224  |
| 7,171,337 | B2 * | 1/2007  | Yuan et al.      | 702/185  |
| 7,216,260 | B2 * | 5/2007  | Hartmann et al.  | 714/39   |
| 7,475,405 | B2 * | 1/2009  | Manganaris et al.| 719/318  |
| 7,509,539 | B1 * | 3/2009  | Denefleh et al.  | 714/48   |
| 7,523,357 | B2 * | 4/2009  | Irby et al.      | 714/47.2 |
| 7,840,946 | B2 * | 11/2010 | Gupta et al.     | 717/124  |
| 7,861,125 | B2 * | 12/2010 | Yamazaki et al.  | 714/47.1 |
| 8,095,830 | B1 * | 1/2012  | Cohen et al.     | 714/45   |
| 9,026,467 | B2 * | 5/2015  | Bammi et al.     | 705/35   |
| 2009/0144625 | A1 * | 6/2009 | Muller et al.   | 715/723  |

* cited by examiner

*Primary Examiner* — Joseph Schell
(74) *Attorney, Agent, or Firm* — Steven L. Nichols; VanCott, Bagley, Cornwall & McCarthy P.C.

(57) ABSTRACT

Avoiding failure repetition in data processing includes storing a sequence of circumstances leading up to a previous failure, monitoring circumstances in a current process, matching a sequence of circumstances in the current process to a stored sequence of circumstances, and applying rules to determine if the current process should proceed.

22 Claims, 7 Drawing Sheets

FAILURE REPETITION AVOIDANCE IN DATA PROCESSING

BACKGROUND

The present invention relates, in general, to the field of failure prevention in data processing, and, more particularly, to avoiding failure repetition.

Failures occur in many areas of data processing and can be time consuming and frustrating. Repeated failures can be caused by a set of circumstances that trigger a failure. Particular areas of data processing are susceptible to repeated errors. Some such errors result in invalid recursive calls which cause serious results. Conventionally, recursive checking may be managed by bespoke coding checks, and there is potential for recursive loops to take place.

BRIEF SUMMARY

A system for avoiding failure repetition in data processing, comprising a storage device configured to store of a number of sequences of circumstances leading up to a previous failure, a monitor for monitoring circumstances in a current process and matching a sequence of circumstances in the current process to one of the stored sequences of circumstances, and a rules engine for applying rules to determine if the current process should proceed based on output from the monitor.

A method for avoiding failure repetition in data processing, comprising storing a number of sequences of circumstances leading up to a previous failure, providing a processor programmed to monitor circumstances in a current process, matching a sequence of circumstances in the current process to one of the stored sequence of circumstances, and applying rules to determine if the current process should proceed.

A computer program product for avoiding failure repetition in data processing, the computer program product comprising a computer readable storage medium having computer usable program code embodied therewith, the computer usable program code comprising, computer usable program code configured to store a number of sequences of circumstances leading up to a previous failure, computer usable program code configured to monitor circumstances in a current process, computer usable program code configured to match a sequence of circumstances in the current process to one of the stored sequence of circumstances, and computer usable program code configured to apply rules to determine if the current process should proceed.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
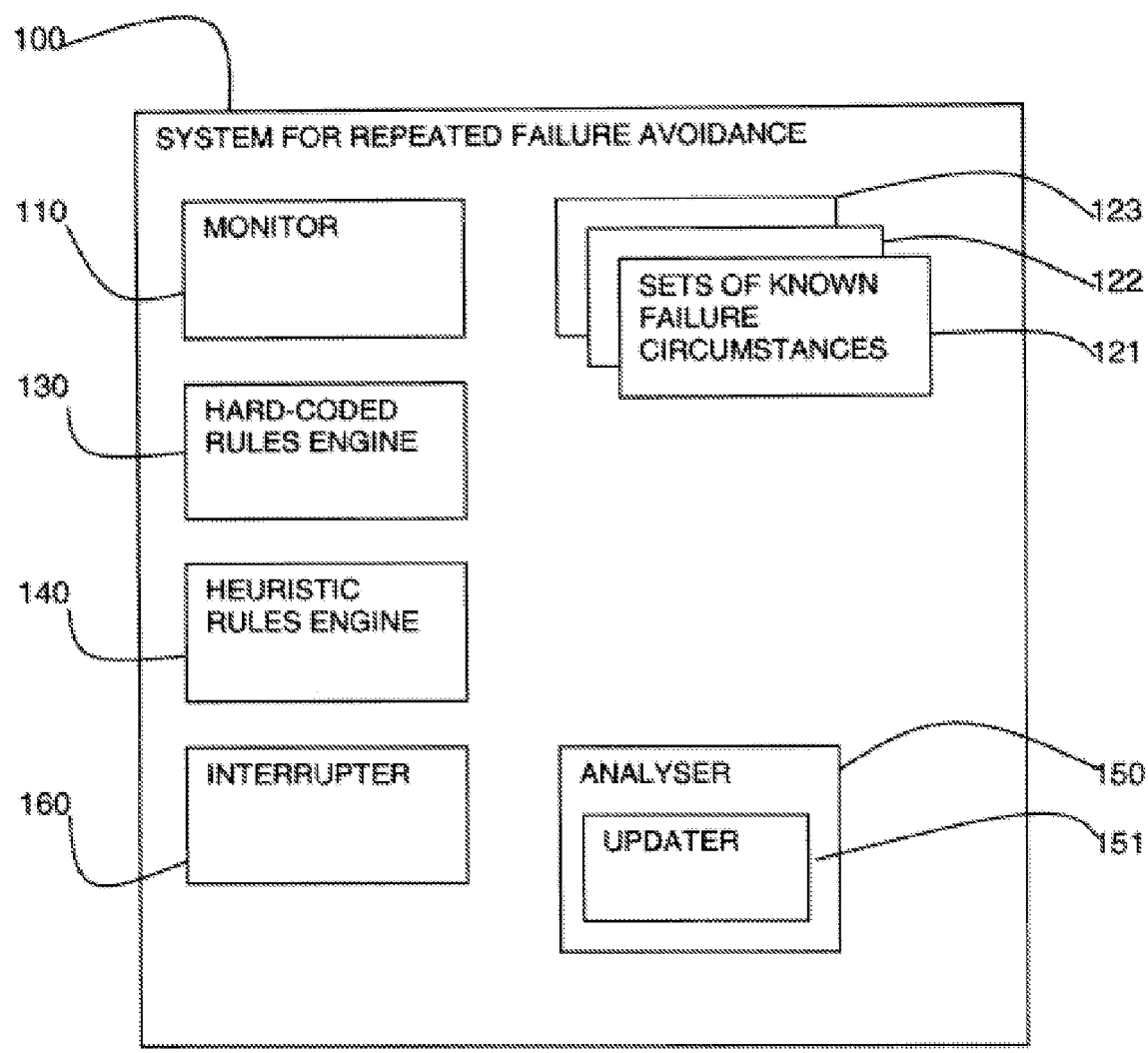
FIG. 1 is a block diagram of a system, according to one exemplary embodiment of principles described herein.

The present specification discloses a method, system, and computer program product for avoiding repeated failures in data processing. The potential for failures to be repeated is avoided by providing the ability to capture the sequence of circumstances that led up to an instance of a failure. By monitoring a failure's preceding circumstances and by capturing this sequence of circumstances, the described method and system allows for the prevention of a subsequent failure by rejecting similar circumstances in the future. Circumstances which may be captured include events, variables, parameters, conditions, resources in use, etc.

The described method, system, and computer program product capture and save the sequence of circumstances leading to an instance of a failure and then applies decision-making to determine whether to prevent subsequent activities repeating the same series of circumstances. The decision-making logic can obey hard-coded rules defined by a user when determining whether or not to allow particular events to occur. It can also apply heuristically-learned rules based upon the failures it detects during the runtime of the system and autonomically work to discover and correct such faults occurring.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present system and method. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to FIG. 1, a block diagram shows a system (100) for avoiding repeated failures. The system (100) includes a monitor (110) for monitoring a data processing process. The monitor (110) monitors circumstances of a data processing process including events such as the repetition of program names or transactions, repetition of abend sequences, repeated patterns of storage or CPU usage, repetition of user identification (user ID) sign-ons, etc. The monitor (110) may monitor circumstances.

The system (100) accesses previously recorded sets of sequences (121-123) of circumstances. The recorded sets of sequences (121-123) are stored from previous failures.

The system (100) includes a hard-coded rules engine (130) and an heuristic rules engine (140). The system (100) also includes an analyzer (150) for analyzing the effect of a process and an updater (151) for updating the heuristic rules engine (140) based on the effect of a process and for updating the recorded sets of sequences (121-123). The system (100) also includes an interrupter (160) for interrupting a process being monitored before a failure occurs.

Figure 2:
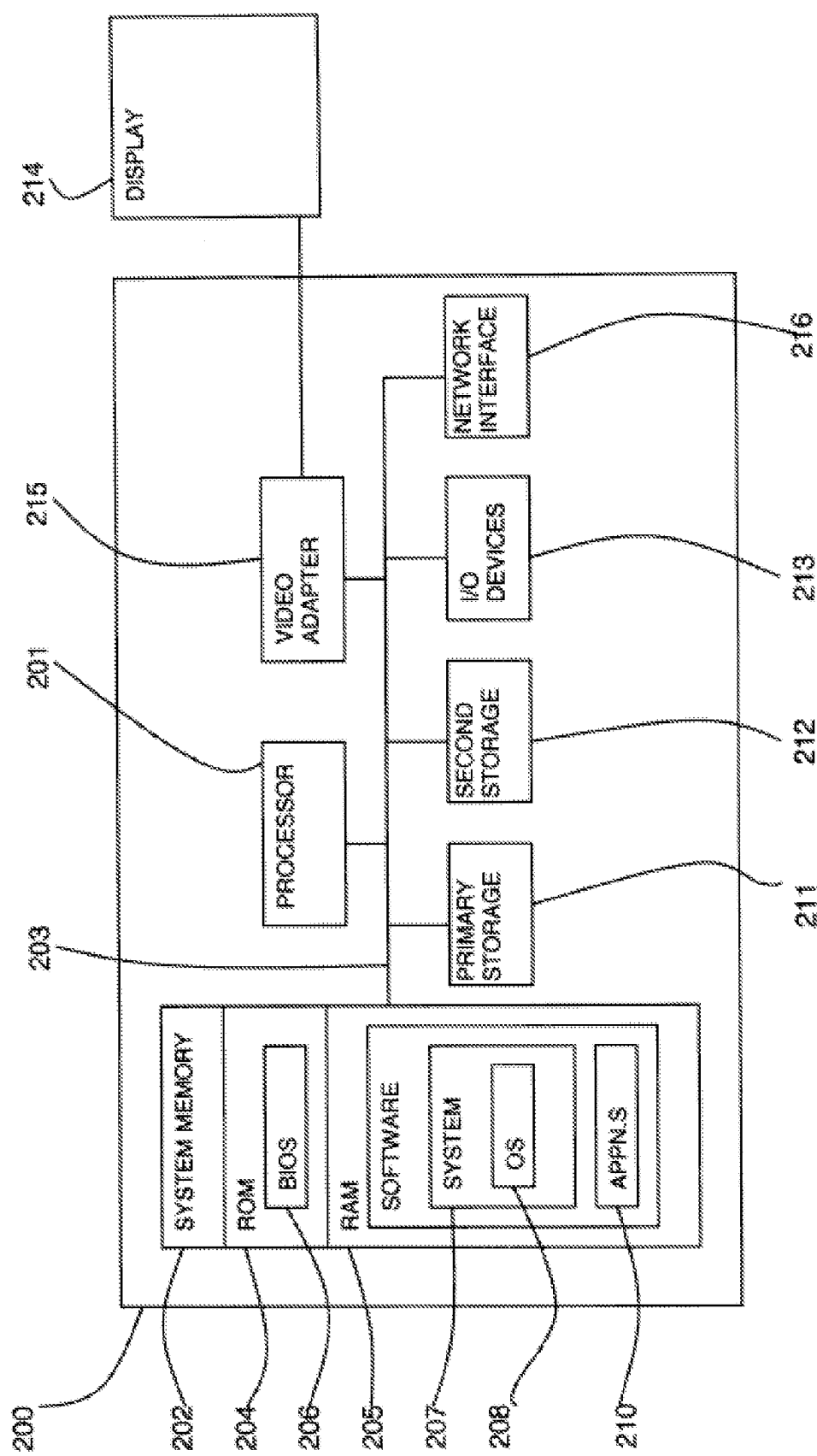
FIG. 2 is a block diagram of a computer system in which the present system and methods may be implemented, according to one exemplary embodiment of principles described herein.

Referring to FIG. 2, an exemplary computer system for implementing the system for avoiding repeated failures includes a data processing system (200) suitable for storing and/or executing program code including at least one processor (201) coupled directly or indirectly to memory elements through a bus system (203). The memory elements can include local memory employed during actual execution of the program code, bulk storage, and cache memories which provide temporary storage of at least some program code in order to reduce the number of times code must be retrieved from bulk storage during execution.

The memory elements may include system memory (202) in the form of read only memory (ROM) (204) and random access memory (RAM) (205). A basic input/output system (BIOS) (206) may be stored in ROM (204). System software (207) may be stored in RAM (205) including operating system software (208). Software applications (210) may also be stored in RAM (205).

The system (200) may also include a primary storage device (211) such as a magnetic hard disk drive and a secondary storage device (212) such as a magnetic disc drive and an optical disc drive. The drives and their associated computer-readable media provide non-volatile storage of computer-executable instructions, data structures, program modules and other data for the system (200). Software applications may be stored on the primary and secondary storage devices (211, 212) as well as the system memory (202).

The computing system (200) may operate in a networked environment using logical connections to one or more remote computers via a network adapter (216). Also, input/output devices (213) can be coupled to the system either directly or through intervening I/O controllers. A user may enter commands and information into the system (200) through input devices such as a keyboard, pointing device, or other input devices (for example, microphone, joy stick, game pad, satellite dish, scanner, or the like). Output devices may include speakers, printers, etc. A display device (214) is also connected to system bus (203) via an interface, such as video adapter (215).

Figure 3:
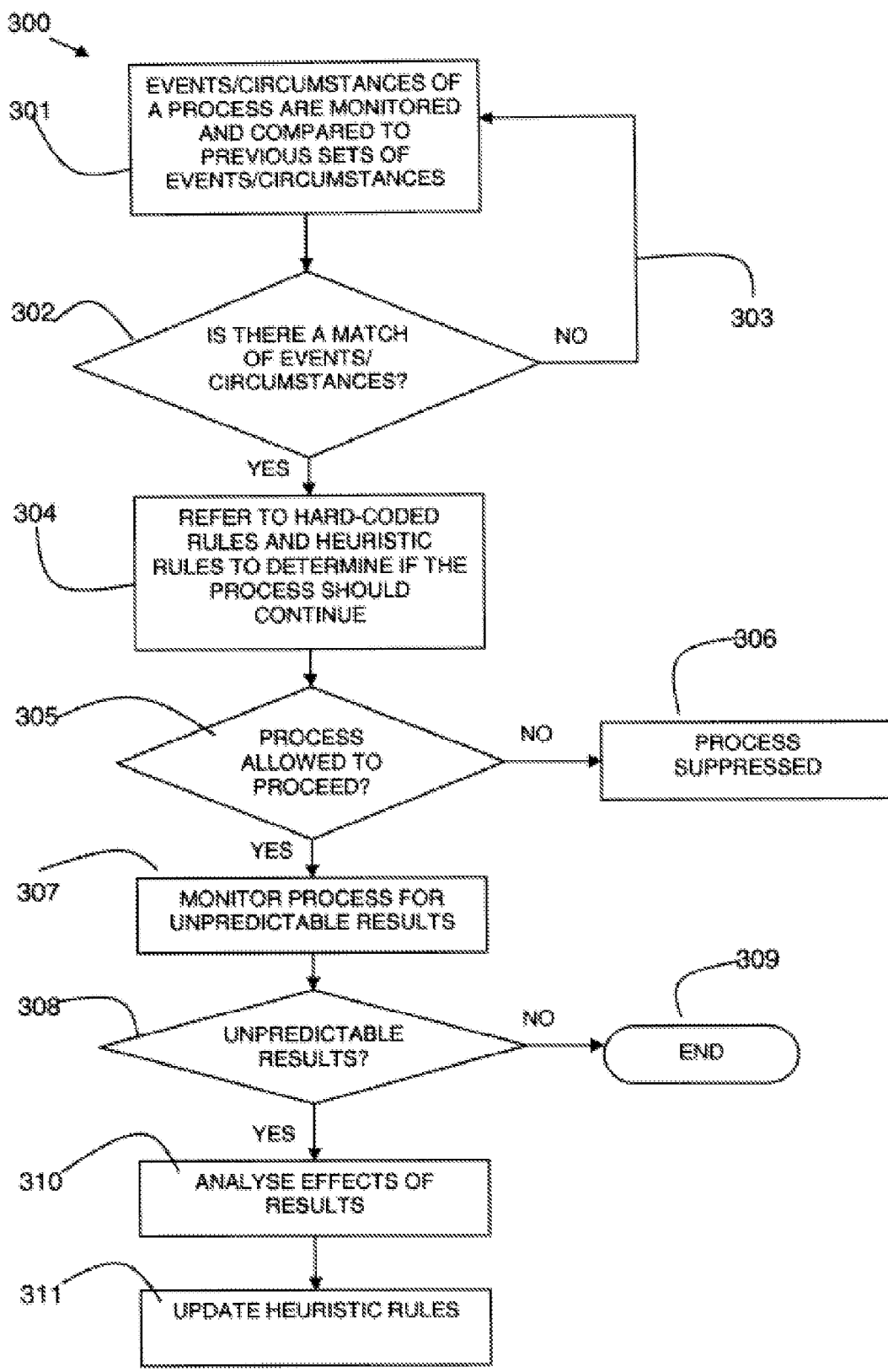
FIG. 3 is a flowchart showing an illustrative method of avoiding repeated failures, according to one exemplary embodiment of principles described herein.

Referring to FIG. 3, a flow diagram (300) shows the described method of avoiding repeated failures. The events and/or circumstances of a process are monitored and compared to previously recorded set of sequences of events and/or circumstances which led to a failure (step 301). Next, it is determined if there is a match of sequences (step 302). If there is no match, the method loops (step 303) and the monitoring continues (step 301). If there is a match, it is referred to the hard-coded rules and heuristically learned rules (step 304) to determine if the process should continue (step 305). If the rules dictate that the process should not continue, the process is suppressed (step 306).

If it is decided that the process can continue, the process is monitored (step 307) and it is determined if there are any unpredictable results (step 308). If there are no unpredictable results, the process ends successfully (step 309). If there are unpredictable results, the effect of the results is analyzed (step 310) and the heuristic rules are updated (step 311).

Two example embodiments are now described. However, it will be appreciated that the described method can be applied to a wide range of different processes and environments. The first example is the case of calling a program recursively, leading to an unexpected failure. The second example is of a non-recursive sequence of calls leading to an unexpected failure.

Figure 4A:
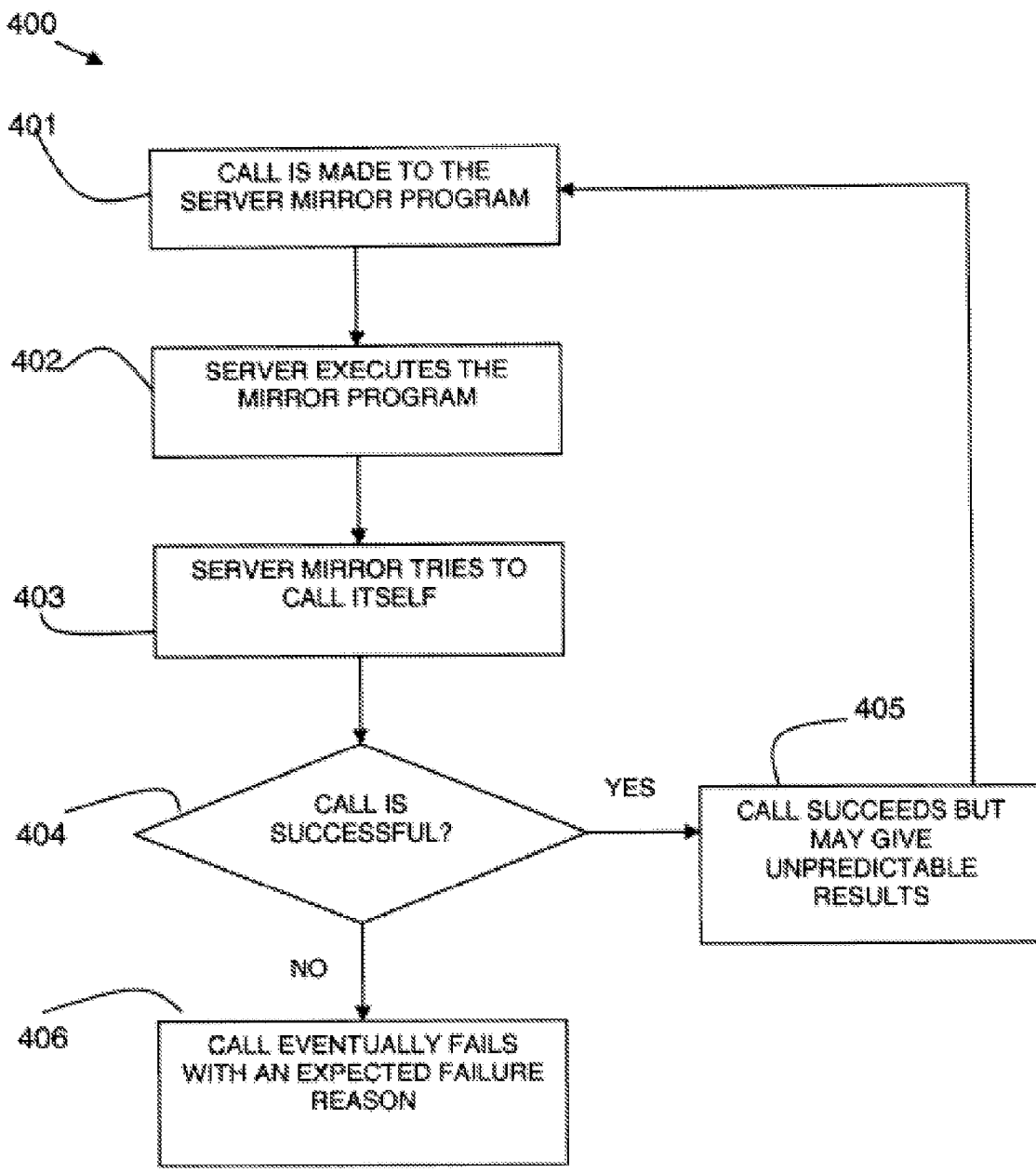
FIG. 4A is a flowchart showing a first embodiment of a failure scenario, according to one exemplary embodiment of principles described herein.

In the example of calling a program recursively, a call has been made to a program on a remote server system. Such calls may be handled via a special system program (the "mirror"). This is something that is provided implicitly, and does not need to be specified on the call itself. If the user makes a mistake of defining the target program name as the mirror program, rather than the actual program to be called, then a loop can occur with unpredictable results. This is illustrated in the flow diagram (400) of FIG. 4A. A call is made to the server mirror program (step 401). The server executes the mirror program (step 402). The server mirror program tries to call itself (step 403). Next, it is determined if the call is successful or fails (step 404). If the call is successful, it may give unpredictable results (step 405). Otherwise, the call may eventually fail with an unexpected failure reason (for example, short-on-storage condition, memory error, resource constraints, etc.) (step 406).

Aspects of the present invention provide a combination of hard-coded and heuristically-learned rules that would result in a controlled, rather than an unexpected, failure. For example, if 10 recursive calls result in an unexpected failure, the transaction could be terminated in a controlled manner after 9 calls. Alternatively, the combined hard-coded rules and learned decision making could result in a decision to prevent such a call if it occurred on a given system which was more prone to failing as a result of such recursive activity.

Figure 4B:
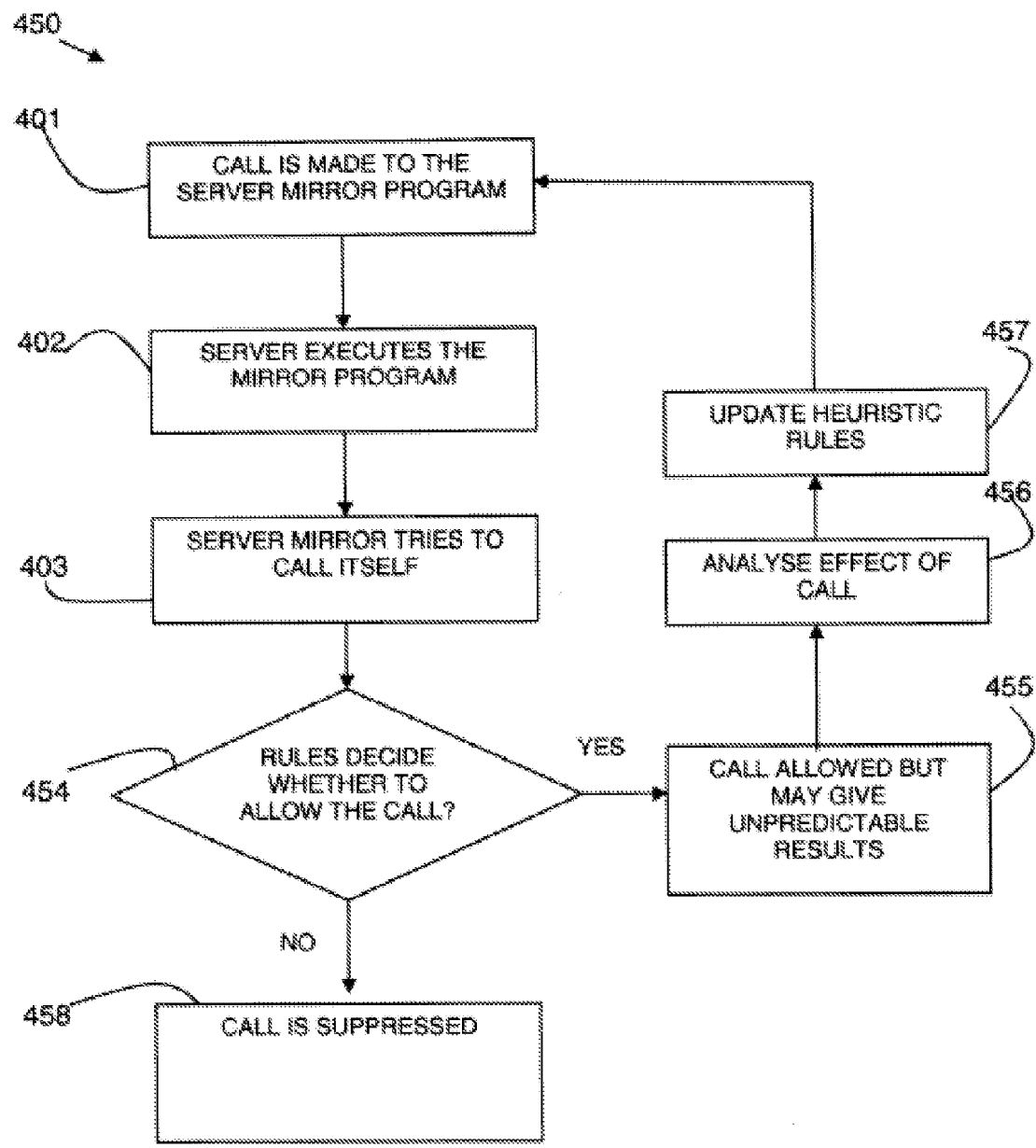
FIG. 4B is a flowchart showing the first embodiment of a failure scenario of FIG. 4A as addressed by the present system and method, according to one exemplary embodiment of principles described herein.

The revised flow diagram (450) for the same situation is shown in FIG. 4B. As before, a call is made to the server mirror program (step 401). The server then executes the mirror program (step 402). Next, the server mirror program tries to call itself (step 403). The hard-coded rules and heuristically learned rules, decide whether to allow the call (step 454). If the call is allowed, it may still give unpredictable results (step 455). The effect of such a call is analyzed (step 456) and the heuristic rules are updated based on the effect of the call (step 457). If the call is not allowed, the call is suppressed by the combination of logic based upon the hard-coded rules and the heuristically learned actions (step 458).

The scenario described above may take place in the IBM® CICS® Transaction Server (IBM and CICS are registered trademarks of International Business Machines Corporation in the United States, other countries or both) which is implemented by a batch program using the EXCI interface to EXEC CICS LINK to a target program within CICS. There is the need for the server region to provide an environment to execute the target program under. This environment is transparent to the user, and acts as a layer of code that handles the inbound request, packages it into a form that can invoke the server program, then handles the response back from that program and sends this back to the client program that invoked it. The client program should not need to know about this intermediate layer of code, and not have a need to invoke it directly. It is automatically driven by the server system when a client request to call a server target program is received by the server system.

It is possible for the client program to mistakenly try to invoke the intermediate layer of code directly, rather than the target program that it really intended to call. For example, the user may think that they need to explicitly name the intermediate layer of code in order for it to be invoked. However, the server system will always invoke this intermediate program ("for free") as part of the handling of calls from the client to the server system. It should not be explicitly named by the calling client program. If it is passed its own name, it will call itself (rather than the actual target program that the user intended to call). This recursion results in a loop of such invalid calls.

This is a specific example of a more generalized type of issue where an invalid recursive call has been able to take place. The results are undefined, but typically serious. For example, the server system may fail due to lack of resource in attempting to honor repeated recursive stacking calls. Alternatively, it may suffer a particular type of error code.

Aspects of the present invention may ensure that systems can avoid the potential for a recursive invocation of themselves. In the case of the intermediate (transparent) programs in such a client/server environment as described above, possible outcomes are handled abends (a command used to activate, cancel, or reactivate an exit for abnormal termination processing), or rejections of the client request with architected responses that describe the error.

Aspects of the present invention are able to differentiate between valid calls and those that could drive it recursively by such a user error, and to avoid the situation resulting in unpredictable results. In the example given above, the system intercepts a call request from a client and (having constructed the environment to run that call on the server) makes the call to the target program on the server system. The intent is to call a program as named on the request from the client. In this particular scenario, protection is needed against calling itself specifically, since this will result in the server system entering an uncontrolled loop. However, a generic rule that prevents any program from calling itself is not acceptable, since such behavior may well be appropriate (and expected) in certain circumstances.

Aspects of the present invention allow for recursion to be disallowed in such a case as described above, but allowed in other (valid) situations. Aspects of the present invention provide a means for a system to differentiate between cases that were valid recursions and cases that were invalid, and make intelligent decisions based upon previous experience in other cases. Heuristic logic is employed to detect the results from allowing a recursion to occur, and, if negative, steps are taken to prevent it from happening again. The heuristic decision making could be augmented with hard-coded rules that take precedence when particular circumstances are true; for example, restricting the number of recursive calls to a previously specified upper bound (e.g. 5).

In an exemplary embodiment in the context of CICS Transaction Server, the first-failure data capture (FFDC) information is saved and at appropriate points in CICS processing, the current stack environment is compared to the FFDC information to see if there is a match.

In the example of a sequence of calls resulting in unexpected failure, a repeated pattern of events results in an undefined failure condition. In transaction processing environments, it is commonplace for programs to be invoked in defined sequences. For example, program 1 could invoke program 2, which in turn invokes program 3. Such invocation sequences are architected by the application development team.

In certain circumstances, such sequences of events may result in unexpected or undefined failure conditions. The system may be unable to handle a particular stack of program invocations. There may be issues with the data passed between the programs, or with multiple invocations of such program calls under multiple threads of execution.

Figure 5A:
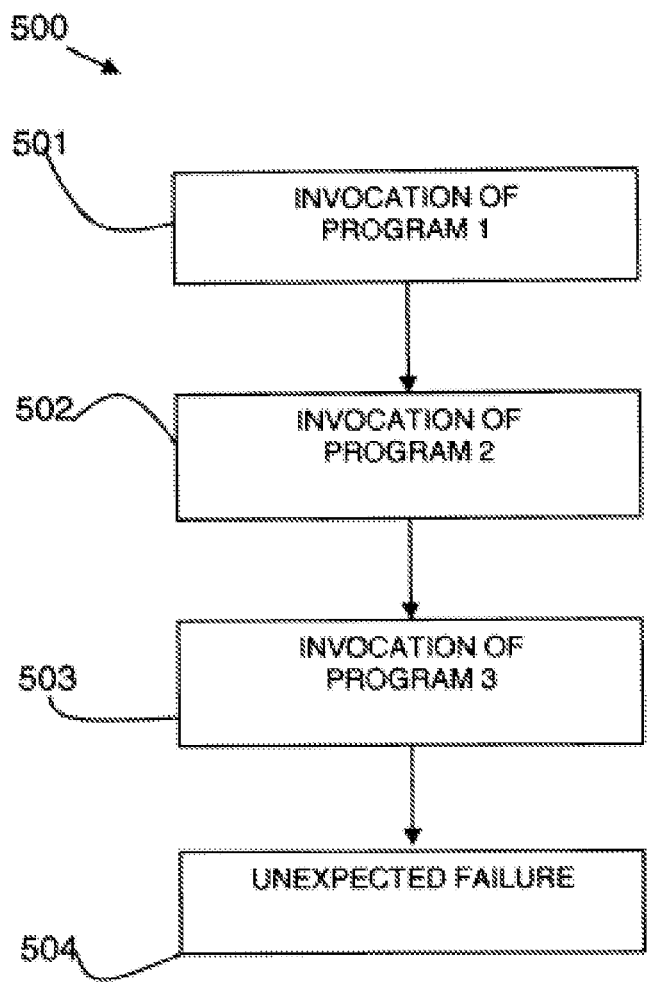
FIG. 5A is a flowchart showing a second embodiment of a failure scenario, according to one exemplary embodiment of principles described herein.

FIG. 5A shows a flow diagram (500) showing the invocation of program 1 (step 501), followed by program 2 (step 502), followed by program 3 (step 503), which results in an unexpected failure (step 504). The combination of hard-coded rules decision making and the effect of failure conditions resulting in heuristically learned decision making, provides a method of avoiding such a situation from occurring in the future if particular conditions are recognized.

Figure 5B:
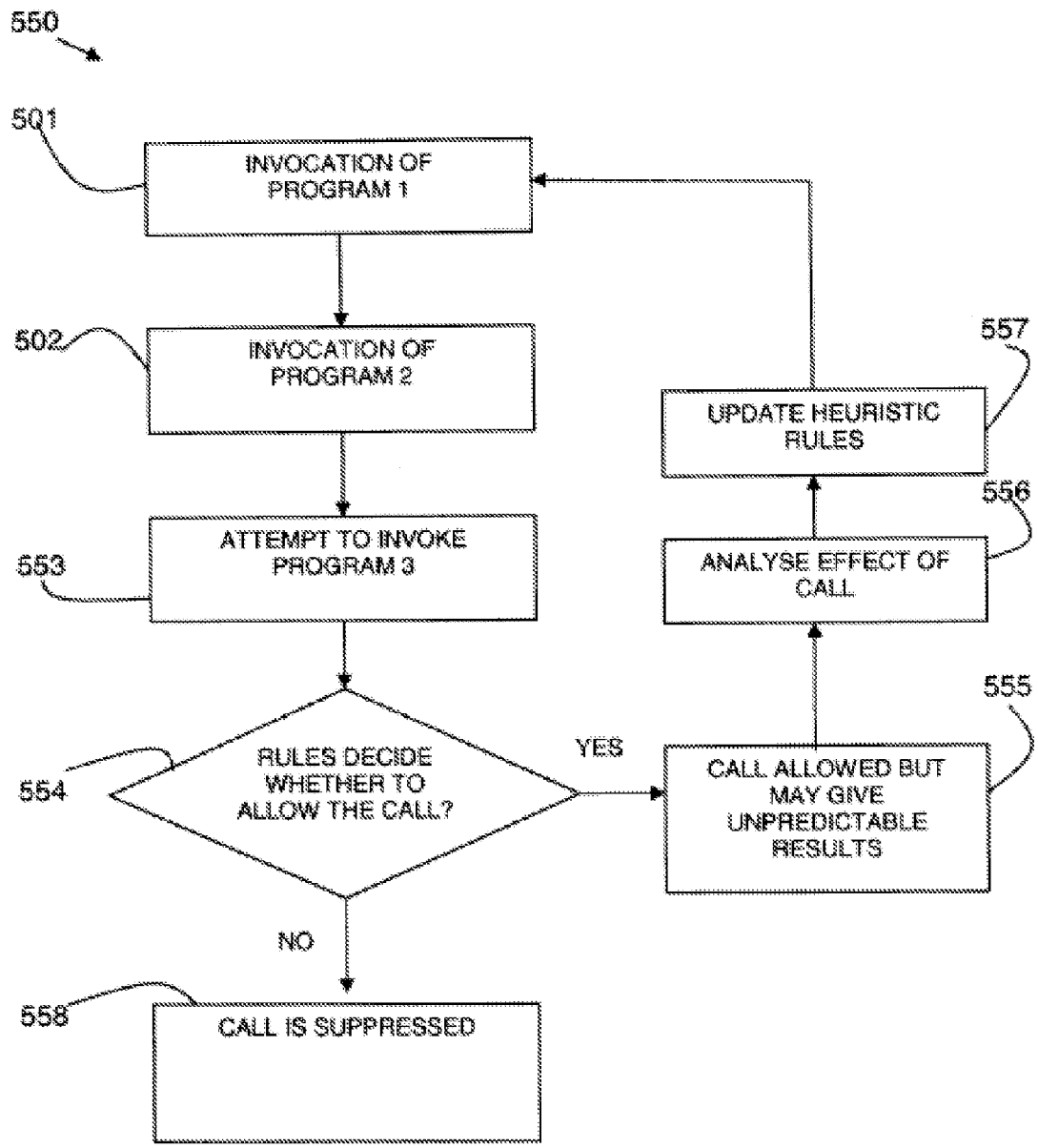
FIG. 5B is a flowchart showing the second embodiment of a failure scenario as addressed by the present system and method, according to one exemplary embodiment of principles described herein.

FIG. 5B shows a flow diagram (550) of the same scenario. The invocation of program 1 (step 501) is followed by the invocation of program 2 (step 502), which in turn is followed by an attempt to call program 3 (step 553). The hard-coded rules and heuristically learned rules, decide whether to allow the call (step 554). If the call is allowed, it may still give unpredictable results (step 555). The effect of such a call is analyzed (step 556) and the heuristic rules are updated based on the effect of the call (step 557). If the call is not allowed, the call is suppressed by the combination of logic based upon the hard-coded rules and the heuristically learned actions (step 558).

In each example, management software would use the hard-coded and heuristically-learned rules to avoid an unexpected failure by monitoring and capturing sequences of circumstances and comparing future circumstances against the hard-coded and heuristically-learned rules. The rules are partly hard-coded and partly heuristically-learned and autonomically applied. The heuristically-learned rules could recognize an unexpected failure (for example, a short-on-storage condition in the example above) and take appropriate action according to hard-coded rules. The management software could apply exact rules, for example, an exactly matching sequence of events, or generic rules such as events occurring in similarly named programs. Monitored circumstances could include repetition of program names or transactions, repetition of abend sequences, repeated patterns of storage or CPU usage, repetition of user ID sign-ons, etc.

First-failure data capture (FFDC) information or particular aspects of the FFDC may be used for the stored sequence of circumstances for comparing a current process to previous failures. FFDC is a general term applied to the set of diagnostic information that is captured automatically when errors occur. This information reduces the need to reproduce errors to get diagnostic information. A variable, specified in the configuration, gives the fully qualified path to the FFDC storage directory. Configuration parameters control the detail of information received in the logs. The information captured by FFDC may include some of the following:

When significant events occur in a process, information is written to the administration notification log. The information is intended for use by database and system administrators. The type of event and the level of detail of the information gathered are configurable.

Diagnostic information about errors is recorded in a text log file. This information is used for problem determination and is intended for customer support. The level of detail of the information is again configurable.

For some error conditions, extra information is logged in external binary dump files named after the failing process ID. A trap file may also be generated, if a process cannot continue processing because of a trap, segmentation violation, or exception. When a process terminates abnormally, the operating system may generate a core file. The core file is a binary file that contains information similar to trap files. Core files may also contain the entire memory image of the terminated process.

Aspects of the present invention avoid the potential for error conditions resulting from invalid recursive calls within programming environments. In the recursive call scenario, the system would provide a heuristic means of learning whether recursive calls to programs were allowable or not, backed up by rules which could be applied in particular cases. In the example described above, the particular error could be avoided by preventing a recursive call in such a case. In another instance of a valid recursive call to a program, the logic could allow such a call to proceed.

This approach could be based upon user defined rules passed to the system, and augmented by experience during the running of the system. In the case of the call to the server environment described above, for example, such an approach would allow a system to learn not to allow such a call to proceed if it had already seen the results of such a failure.

In one exemplary embodiment, a system for avoiding repeated failures may be provided as a service to a customer over a network.

The flowchart and block diagrams in the Figures illustrate the architecture, functionality, and operation of possible implementations of systems, methods, and computer program products according to various embodiments of the present system and method. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present system and method. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present system and method has been presented for purposes of illustration and description, but is not intended to be exhaustive or limited to the present system and method in the form disclosed. Many modifications and variations will be apparent to those of ordinary skill in the art without departing from the scope and spirit of the present system and method. The embodiment was chosen and described in order to best explain the principles of the present system and method and the practical application, and to enable others of ordinary skill in the art to understand the present system and method for various embodiments with various modifications as are suited to the particular use contemplated.

Having thus described the system and method of the present application in detail and by reference to embodiments thereof, it will be apparent that modifications and variations are possible without departing from the scope of the present system and method defined in the appended claims.

What is claimed is:

1. A system for avoiding failure repetition in data processing, comprising:
a storage device configured to store of a number of sequences of circumstances leading up to a previous failure;
a monitor for monitoring circumstances in a current process and matching a sequence of circumstances in the current process to one of the stored sequences of circumstances; and
a rules engine for applying rules to determine if the current process should proceed based on output from the monitor,
wherein matching the sequence of circumstances in the current process to the one of the stored sequences of circumstances comprises applying generic rules for similar circumstances.

2. The system of claim 1, further comprising:
an analyzer for analyzing results of the current process if the current process is allowed to proceed; and
an updater for updating the rules engine.

3. The system of claim 1, further comprising an interrupter for interrupting the current process in a controlled manner.

4. The system of claim 1, in which the rules engine is configured to apply at least one of user-defined rules and heuristically learned rules.

5. The system of claim 1, in which the monitor is configured to capture a sequence of circumstances prior to a failure, and add that sequence of circumstances to the store of sequences of circumstances.

6. The system of claim 1, in which the rules comprise at least one of: restricting the number of recursive calls if the number of recursive calls reaches a predetermined number, instructing interruption of the current process in a controlled manner if the sequences of circumstances in the current process matches a one of the stored sequences of circumstances leading up to a previous failure, and instructing interruption of the current process in a controlled manner if events occurring in similarly named programs fail.

7. A method for avoiding failure repetition in data processing, comprising:
storing a number of sequences of circumstances leading up to a previous failure;
providing a processor programmed to monitor circumstances in a current process;
matching a sequence of circumstances in the current process to one of the stored sequence of circumstances; and
applying rules to determine if the current process should proceed,
wherein matching the sequence of circumstances in the current process to the one of the stored sequence of circumstances comprises applying generic rules for similar circumstances.

8. The method of claim 7, further comprising, if the current process is allowed to proceed, analyzing the results of the current process, and updating the rules.

9. The method of claim 7, further comprising, if the current process is not allowed to proceed, interrupting the current process in a controlled manner.

10. The method of claim 7, in which applying rules to determine if the current process should proceed comprises applying user-defined rules, heuristically learned rules, or combinations thereof.

11. The method of claim 7, further comprising capturing a number of sequences of circumstances leading up to a failure, and adding that sequence of circumstances to the stored sequences of circumstances.

12. The method of claim 11, in which the failure is recognized as an unexpected failure.

13. The method of claim 7, in which the circumstances comprise events, variables, parameters, conditions, resources in use, or combinations thereof.

14. The method of claim 7, in which matching a sequence of circumstances in the current process to one of the stored sequence of circumstances comprises at least one of: repetition of program names, repetition of transactions, repetition of abend sequences, repeated patterns of storage usage, repeated patterns of central processing unit usage, and repetition of user ID signons.

15. The method of claim 7, in which the rules comprise at least one of: restricting the number of recursive calls if the number of recursive calls reaches a predetermined number, instructing interruption of the current process in a controlled manner if the sequences of circumstances in the current process matches a one of the stored sequences of circumstances leading up to a previous failure, and instructing interruption of the current process in a controlled manner if events occurring in similarly named programs fail.

16. A computer program product for avoiding failure repetition in data processing, the computer program product comprising:
a computer readable storage device having computer usable program code embodied therewith, the computer usable program code to:
store a number of sequences of circumstances leading up to a previous failure;
monitor circumstances in a current process;
match a sequence of circumstances in the current process to one of the stored sequence of circumstances; and
apply rules to determine if the current process should proceed, wherein matching the sequence of circumstances in the current process to the one of the stored sequences of circumstances comprises applying generic rules for similar circumstances.

17. The computer program product of claim 16, further comprising:
   computer usable program code to analyze results of the current process and update the rules if the current process is allowed to proceed; and
   computer usable program code to interrupt the current process in a controlled manner if the current process is not allowed to proceed.

18. The computer program product of claim 16, in which the rules comprise at least one of: restricting the number of recursive calls if the number of recursive calls reaches a predetermined number, instructing interruption of the current process in a controlled manner if the sequences of circumstances in the current process matches a one of the stored sequences of circumstances leading up to a previous failure, and instructing interruption of the current process in a controlled manner if events occurring in similarly named programs fail.

19. The computer program product of claim 16, in which the computer usable program code to apply rules to determine if the current process should proceed comprises computer usable program code to apply user-defined rules, heuristically learned rules, or combinations thereof.

20. The computer program product of claim 16, further comprising computer usable program code to capture a number of sequences of circumstances leading up to a failure, and adding that sequence of circumstances to the stored sequences of circumstances.

21. The computer program product of claim 20, in which the circumstances comprise events, variables, parameters, conditions, and resources in use, or combinations thereof.

22. The computer program product of claim 16, in which the computer usable program code to match a sequence of circumstances in the current process to one of the stored sequence of circumstances comprises computer usable program code to match at least one of: repetition of program names, repetition of or transactions, repetition of abend sequences, repeated patterns of storage usage, repeated patterns of central processing unit usage, and repetition of user ID sign-ons.

* * * * *